United States Patent [19]

Leorat

[11] Patent Number: 4,795,864

[45] Date of Patent: Jan. 3, 1989

[54] CONTROL BY SWITCH UNDER FORCE OF A DECLUTCHING SYSTEM AT STOP FOR AUTOMATIC TRANSMISSION

[75] Inventor: François Leorat, Versailles, France

[73] Assignee: Regie Nationale des Usines Renault, Boulogne Billancourt, France

[21] Appl. No.: 65,893

[22] Filed: Jun. 24, 1987

[30] Foreign Application Priority Data

Jun. 24, 1986 [FR] France ............... 86 09073

[51] Int. Cl.⁴ .............. H01H 3/16; B60K 41/00
[52] U.S. Cl. .................. 200/61.91; 74/866; 200/61.89
[58] Field of Search ............ 200/61.89, 61.9, 61.91, 200/161, 302.1, 16 A; 74/856, 858, 866, 874

[56] References Cited

U.S. PATENT DOCUMENTS

| | | | |
|---|---|---|---|
| 2,276,028 | 3/1942 | Dick | 200/61.89 |
| 3,435,165 | 3/1969 | Lombard | 200/61.89 |
| 3,591,748 | 7/1971 | Holden | 200/161 |
| 3,703,620 | 11/1972 | Watanabe | 200/61.89 X |
| 3,710,048 | 1/1973 | Schumacher | 200/61.89 |
| 4,316,065 | 2/1982 | Rupp et al. | 200/61.89 |
| 4,393,285 | 7/1983 | Haraiwa et al. | 200/61.91 X |
| 4,599,917 | 7/1986 | Leorat et al. | 74/866 |
| 4,629,842 | 12/1986 | Picot et al. | 200/61.89 |
| 4,633,985 | 1/1987 | Leorat | 192/0.055 |
| 4,664,137 | 5/1987 | Leorat et al. | 137/118 |
| 4,679,888 | 7/1987 | Leorat et al. | 439/883 |
| 4,691,597 | 9/1987 | Leorat et al. | 74/869 |

FOREIGN PATENT DOCUMENTS 0062458 10/1982 European Pat. Off. .
0120779 10/1984 European Pat. Off. .
1114092 9/1961 Fed. Rep. of Germany .

Primary Examiner—J. R. Scott
Attorney, Agent, or Firm—Fisher, Spivak, McClelland & Maier Oblon

[57] ABSTRACT

The device is mounted on the cable control (1) of the fuel metering system of the engine, and includes mobile contacts (10) and (11) mounted on a contact-holding piece (28) solid with sheath (2), the mobile contacts (10, 11) working with stationary contacts (13) and (12) mounted on conductive tongues (15) and (14) placed in the upper part (16) of the switch. The contact-holding piece (28) is returned into position by a spring, which rests on the lower part (5) of the switch so that for a non-zero force on contact-holding piece (28) the circuit opens between contacts (11) and (12), and (10) and (13). The spring is calibrated so that the return force that it exerts, when the mobile unit of the contact-holding piece (28) comes against stop (22) of lower part (5) of the switch, is less than the force necessary to open the fuel metering system of the engine from its idle position.

5 Claims, 2 Drawing Sheets

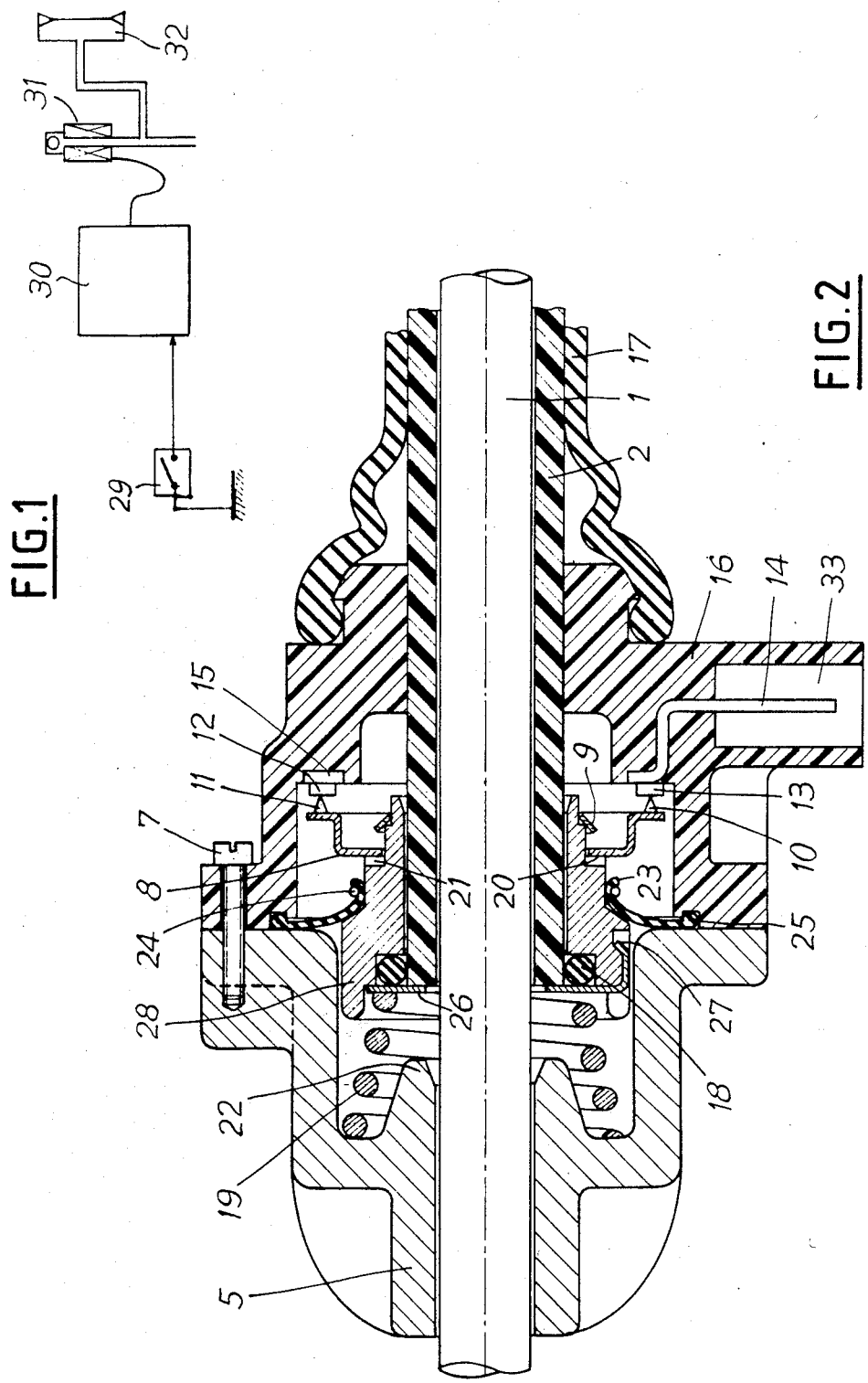

CONTROL BY SWITCH UNDER FORCE OF A DECLUTCHING SYSTEM AT STOP FOR AUTOMATIC TRANSMISSION

BACKGROUND OF THE INVENTION

This invention relates to electric control of the feed pressure of a hydraulic receiver, particularly for an input clutch in first gear of an automatic transmission for a motor vehicle.

For control of this type of clutch, systems called declutching at stop with electronic control are known, such as described in U.S. Pat. No. 4,633,985, which make it possible to eliminate, on a vehicle equipped with an automatic transmission, the spontaneous tendency to "creep" from stop, when driving circumstances cause this tendency to be considered undesirable.

The main difficulty encountered in developing such systems appears during restarting, when the driver again presses on the accelerator and opens, in an essentially variable manner, the throttle (Gasoline engine) or Diesel fuel metering device (Diesel engine); actually, it is very difficult to find adjustments that are satisfactory from the viewpoint of comfort in starting both for a start with a light depression of the throttle and for a full throttle start. The drawbacks are reflected by a jerk at acceleration that is unacceptable considering the standards of comfort demanded of modern automatic transmissions.

These deficiencies are explained by the fact that the stop declutching systems known so far are activated by the simultaneous occurrence of preset conditions particularly in the speed of the vehicle, the speed of the engine, the output speed of the converter and the position of the fuel feed metering element of the engine; in particular, for this latter, most often the condition $$\alpha c = \alpha c \text{ at idle}$$

is imposed.

It is precisely this latter condition that is insufficient to assure under all circumstances the comfort demanded at restarting. Actually, this single condition on $\alpha c$ does not take into account:

The advantage and pleasure in being able to make maneuvers at idle, precisely by using the phenomenon of "creeping" peculiar to automatic transmissions; actually, to cause declutching to cease at stop, $\alpha c$ must be greater than $\alpha c$ idle, which comes down to pressing notably on the accelerator;

The inevitable response time in filling the cylinder of the input clutch, which although kept in lined-up position, is not able to transmit without some delay, even though minimal, the full engine torque during full throttle start; by its very nature, the $\alpha c$ measurement does not permit any anticipation of the arrival of the torque, an anticipation that would make it possible to reduce the response time of the input clutch.

SUMMARY OF THE INVENTION

This invention makes it possible to remedy said drawbacks of the known systems of "stop declutching" for automatic transmissions, by replacing the measurement of $\alpha c$ with a "pressed foot" switch inserted on the accelerator control, which has the object of detecting whether the driver is pressing on the accelerator without, however, opening the throttle beyond the $\alpha c$ idle position; this switch is characterized by an actuation force such that there is detected a pressing force of the foot on the accelerator which is significant, while remaining particularly less than the level of the force of pressing on the accelerator from which the element for metering fuel to the engine begins to open; the driver is thus able to recover the "creep" at idle without, however, exceeding the idling speed by being able to modulate his force on the accelerator pedal.

According to a preferred embodiment of the invention, a switch coaxial with the accelerator cable supplies to the electronic control package of the automatic transmission a grounding signal when the driver of the vehicle stops actuating the accelerator pedal. The control of this switch is sensitive to the pull on the accelerator cable, so that the ground contact is opened for a force level on the cable that is non-zero but less than the level necessary to begin opening the fuel metering system to the engine from the idle position. The grounding signal described above completes the other signals which contribute to the functioning of a stop declutching device like that described in U.S. Pat. No. 4,633,985.

According to an embodiment of the invention, the device for control by switch under force, particularly for a stop declutching system of an automatic transmission, is mounted on the cable control of the fuel metering system of the engine, and comprises mobile contacts mounted on a contact-holding piece solid with the sheath, said mobile contacts working with stationary contacts mounted on conductive tongues placed in the upper part of the switch; said contact-holding piece being brought into position by elastic sheath biasing return means, which rest on the lower part of the switch, so that for a non-zero force on the contact-holding piece, the circuit opens between the contacts; the elastic return means being formed so that the return force that they exert on the sheath, when the mobile unit comprising the contact-holding piece comes against the stop of the lower part of the switch, is less than the force necessary to begin to open the fuel metering system of the engine from its idle position in opposition to the fuel metering system biasing means.

According to an embodiment of the invention, the elastic return means consist of a conical spring.

According to an embodiment of the invention, the contact-holding piece comprises two diametrically opposite semicylindrical studs, which support a cup to which are fastened the two mobile contacts to allow a certain freedom of positioning of said cup, which cannot escape from the contact-holding piece because of a reverse-lock conical washer mounted against a shoulder of said contact-holding piece.

According to an embodiment of the invention, the contact-holding piece is made solid with the end of the sheath by means of a stop washer secured by crimping lugs on said contact-holding piece.

According to an embodiment of the invention, the device for control by switch comprises a sealing system between the contact-holding piece and the sheath, between the contact-holding piece and the lower and higher parts of the switch, and between the sheath and the upper part of the switch.

According to an embodiment of the invention, the sealing system between the contact-holding piece and the sheath consists of an O ring confined between the sheath, the contact-holding piece and the stop washer.

According to an embodiment of the invention, the sealing system between the contact-holding piece and the lower and upper parts of the switch consists of a membrane clamped to the contact-holding piece by an O ring; said membrane being confined between the lower part and upper part of the switch in a circular groove.

According to an embodiment of the invention, the sealing system between the sheath and the upper part of the switch is made by means of a flexible sleeve, which allows the relative movement of the sheath in relation to the body of the switch.

According to an embodiment of the invention, the lower and upper parts of the switch are assembled by screws.

BRIEF DESCRIPTION OF THE DRAWINGS

There will now be described a nonlimiting example of the invention with reference to the accompanying drawings in which:

FIG. 1 is a skeleton diagram of the invention in a stop declutching control system such as described in U.S. Pat. No. 4,633,985;

FIG. 2 shows the switch of the invention, in a view in section along a plane going through the axis of the accelerator control cable;

DETAILED DESCRIPTION OF THE PREFERRED EMBODIMENTS

Figure 3:
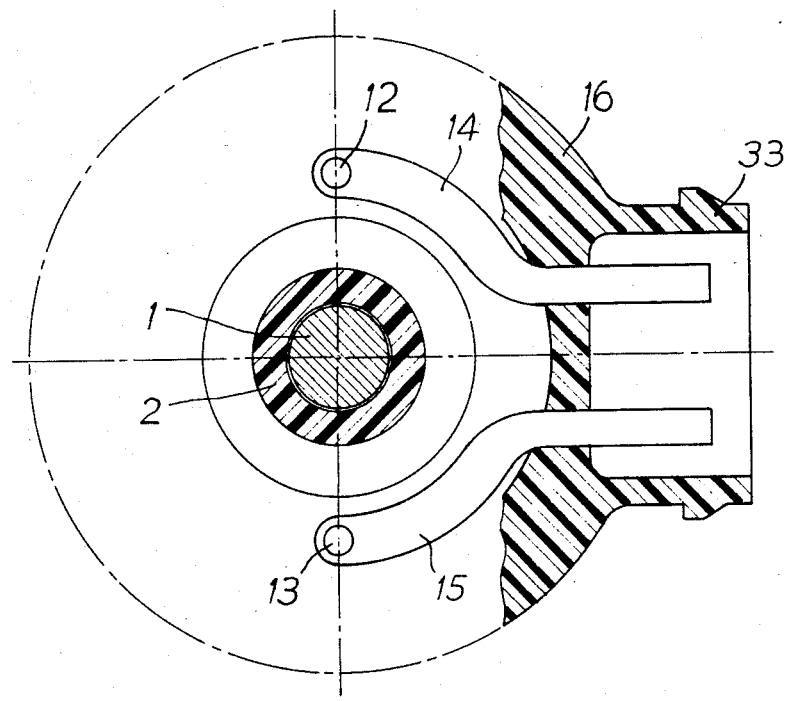
FIG. 3 is a bottom view of the part, on the side of the origin of the switch of the invention.
Figure 4:
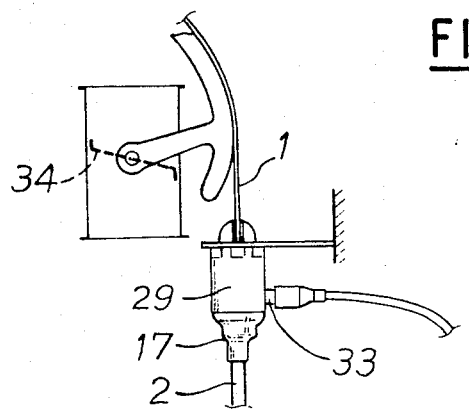
FIG. 4 is an installation diagram of the switch on the accelerator control.

In a nonlimiting way, the invention is described in the context of a cable type accelerator control element for throttle valve 34, but the invention would be suitable for any other type of control where force on the control element is available. In the point of view of a cable control element 1 sliding in its sheath 2, the force on the sheath is picked up by a mobile contact-holding piece 28 which is made solid with the end of the sheath 2 by means of a stop washer 26 secured to the contact-holding piece by crimping lugs 27. The sealing of the switch in regard to rising of fluid along sheath 2 is assured by an O ring 18 confined between stop washer 26, contact-holding piece 28 and sheath 2, in a groove made in the contact-holding piece. The force on sheath 2 is transmitted to lower part 5 of the switch by a sheath biasing conical spring 19 whose end part rests on stop washer 26; the travel of conical spring 19 is limited axially by stop 22 on which contact-holding piece 26 rests. The characteristics of conical spring 19 are such that the return force that it exerts on the unit of the sheath and contact-holding piece 28 at the position where they arrive against the stop is less than that necessary to begin opening fuel metering element 34 from its idle position in opposition to a fuel metering system biasing means.

Contact-holding piece 28 supports, by two diametrically opposite semicylindrical studs 20 and 21, a metal cup 8 to which are fastened the two mobile contacts 10 and 11; semicylindrical studs 20 and 21 allow a certain freedom of positioning to cup 8, which cannot escape from contact-holding piece 28 thanks to a reverse-lock conical washer 9 mounted against a shoulder of contact-holding piece 28.

Sealing of the switch at the level of contact-holding piece 28 is assured without friction by a membrane 23 held clamped on contact-holding piece 28 by an elastic seal 24. This membrane 23 is confined between lower part 5 and upper part 16 of the switch, in a circular groove 25, which assures the peripheral sealing of the switch. Upper 16 and lower 5 parts are assembled, in a nonlimiting manner, by screws 7.

When cable 1 is subjected to a slight force, contacts 10 and 11 are applied to stationary contacts 12 and 13, also diametrically opposite. Stationary contacts 12 and 13 are fastened to conductive tongues 14 and 15 which are shaped to constitute the two male pins of a tight connector 33 integrated into the upper part 16 of the switch. Sealing of the switch in relation to sheath 2 is achieved by means of a flexible sleeve 17 which allows a relative movement of sheath 2 and of the body of switch 29.

When a force that is zero at the base at the location of conical spring 19 is applied to cable 1 (which corresponds to the situation of the foot not pressing on the accelerator pedal), mobile contacts 10 and 11 rest on stationary contacts 12 and 13; switch 29 therefore supplies ground signal data to electronic control package 30, which delivers, according to its program, a signal for activation of solenoid valve 31, controlling filling of cylinder 32 (cf. U.S. Pat. No. 4,633,985). When a force in a first direction on cable 1 exceeds the calibration setting of conical spring 19, which corresponds to the situation of the foot pressing on the accelerator pedal, the sheath and contact holding piece 28 move in a second direction toward the stop 22 so that mobile contacts 10 and 11 separate from stationary contacts 13 and 12, and the ground data disappears, which causes the stopping of solenoid valve 31 before the fuel metering element 34 moves from the idling position.

I claim:

1. In an automatic transmission having an electrically operated stop declutching system and a fuel metering system normally biased in an idling position by fuel metering system biasing means, and a fuel system cable control means including a cable slidable in a sheath, said cable having one end operatively connected to said fuel metering system for operating said fuel metering system upon movement of said cable in a first direction, a device for controlling said stop declutching system, comprising:

means for biasing said sheath in said first direction;
   stop means for permitting a limited degree of movement of said sheath in a second direction opposite said first direction, wherein said sheath biasing means normally maintains said sheath spaced from said stop means and wherein said sheath biasing means has a force less than that of said fuel metering system biasing means, whereby a force for moving said cable in said first direction will move said sheath in said second direction by said limited degree of movement to engage said stop means before said cable begins to move in said first direction to operate said fuel metering system; and
   electrical means for changing an operating state of said stop declutching system upon movement of said sheath within said limited degree of movement.

2. The automatic transmission of claim 1, wherein said electrical means for changing an operating state of said stop declutching system comprises:

a contact holding piece fixed to said sheath;
   fixed electrical contacts electrically connected to said stop declutching system; and
   mobile electrical contacts mounted on said contact holding piece at positions such that said fixed and mobile contacts are in electrical contact with one another only when said sheath is spaced from said stop means.

3. The automatic transmission of claim 1, wherein said sheath biasing means comprise a conical spring.

4. The automatic transmission of claim 2, wherein said contact holding piece comprises:
a body mounted concentrically around said sheath;

a cup mounted on said body, said fixed contacts being mounted on said cup; and means for permitting play between said body and said cup.

5. The automatic transmission of claim 2, including means for moisture sealing said fixed and mobile contacts.

* * * * *

UNITED STATES PATENT AND TRADEMARK OFFICE
CERTIFICATE OF CORRECTION

PATENT NO. : 4,795,864
DATED : January 3, 1989
INVENTOR(S) : Francois LEORAT

It is certified that error appears in the above-identified patent and that said Letters Patent is hereby corrected as shown below:

On the Title Page:

"Attorney, Agent, or Firm" should be corrected to read as follows:

-- Oblon, Fisher, Spivak, McClelland & Maier --

Signed and Sealed this

Twenty-seventh Day of June, 1989

Attest:

DONALD J. QUIGG

Attesting Officer

Commissioner of Patents and Trademarks